Sept. 9, 1924.  H. F. FRENCH ET AL  1,507,809
DRY BATTERY
Filed Aug. 9, 1920
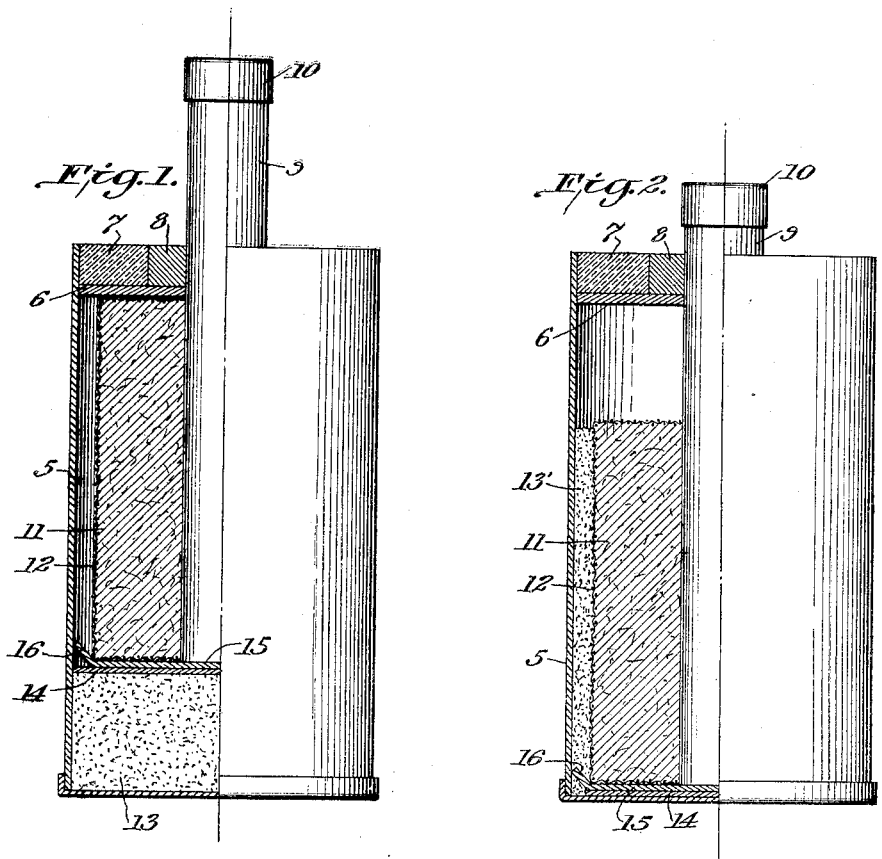

Patented Sept. 9, 1924.

1,507,809

UNITED STATES PATENT OFFICE.

HARRY F. FRENCH AND RAYMOND C. BENNER, OF FREMONT, OHIO, ASSIGNORS TO NATIONAL CARBON COMPANY, INC., A CORPORATION OF NEW YORK.

DRY BATTERY.

Application filed August 9, 1920. Serial No. 402,341.

*To all whom it may concern:*

Be it known that we, HARRY F. FRENCH and RAYMOND C. BENNER, both citizens of the United States, both residing at Fremont, in the county of Sandusky and State of Ohio, have invented certain new and useful Improvements in Dry Batteries, of which the following is a specification.

This invention relates to dry batteries of the deferred action type and of the kind in which the electrolyte necessary for the operation of the battery is stored in the bottom of a cup-shaped electrode, a depolarizing electrode being mounted within the cup-shaped electrode but above the upper surface of the electrolyte. So long as the parts of the battery are maintained in this position, the electrolyte is substantially out of contact with the depolarizing electrode and the battery is inactive.

U. S. Letters Patent 1,289,433 on the invention of Harry F. French, patented December 31, 1918, disclose a battery of the above described type in which the depolarizing electrode is held in position in the upper part of the zinc cup electrode by means of a screw-threaded member attached to the depolarizing electrode, the threads of this attached part engaging interfitting threads on the zinc cup electrode. In the battery described in the French patent, the threaded portions are only partly engaged when the parts of the battery are in inactive position, and on screwing the threaded parts together the bobbin electrode is caused to enter further into the zinc cup electrode, whereby it encounters the body of electrolyte material in the bottom of the zinc cup electrode and causes this electrolyte material to rise between the adjacent surfaces of the respective electrodes, thereby activating the battery.

The object of the present invention is to simplify the construction of batteries of the type disclosed in the French patent, eliminating certain parts and thereby decreasing the cost of production of such batteries, at the same time preserving the advantageous features which are inherent in batteries of this type. Other objects of the invention and the manner they are attained will be apparent from the following description taken in connection with the annexed drawings, in which—

Fig. 1 is a view, partly in section and partly in elevation, of the battery with its parts in inactive position;

Fig. 2 is a similar view of the battery when the parts have assumed the positions which they occupy when the battery is active; and Fig. 3 is a plan of the serrated disc 15 shown in Figs. 1 and 2.

In the drawings, 5 is a zinc container electrode of any usual construction. At its upper end the container electrode is provided with a closure consisting of a washer 6 of strawboard or the like, and a pitch seal 7. In the preferred modification, this pitch seal takes the form of an annulus adjacent the zinc, filling the space between the zinc and the bushing 8 and resting on the washer 6. The bushing 8 is, like the seal 7, of annular form, and in the battery illustrated in the drawing, it has a circular aperture in which is mounted a carbon rod 9 which serves as a part of the negative electrode of the battery. The carbon rod 9 conforms closely to the aperture in the bushing 8 and may be provided with the usual metal end cap 10. The washer 6 extends inwardly to the surface of the carbon rod 9.

Formed about the lower end of the carbon rod 9 is a bobbin of depolarizing mix 11, which may be molded or shaped in any suitable way about its central core. The bobbin 11 may be wrapped in gauze 12 or provided with any other suitable protective covering. Electrolyte paste, which may be the usual cereal paste employed in dry batteries, is shown at 13 in Fig. 1 and at 13' in Fig. 2. In the active condition of the cell, the bobbin 11 is located in the upper part of the zinc cup 5, for example, with its upper surface against the washer 6, and in this position the lower surface of the bobbin 11 is separated from the electrolyte paste 13 by means of a layer 14 of fragile material, such as paraffin wax, and a serrated disc 15, the latter member being composed of material of considerable mechanical strength and stiffness.

The bushing 8 is preferably formed of a yieldable material which will conform to slight irregularities of the carbon rod 9 and at the same time maintain a reasonably tight seal around the periphery of the carbon rod. We have found rubber to be well adapted as material for this bushing. The serrated disc 15, which should be impervious to the liquids contained in the battery and maintain its stiffness after long contact with them, may be advantageously formed of celluloid.

The operation and functions of the various parts will be apparent from the foregoing description. In the position of the parts shown in Fig. 1, the electrodes are thoroughly insulated from each other by means of the discs 14 and 15, and the battery is therefore inactive and free from deterioration so long as the position of the parts remains unchanged. The paste is retained in position by the layer of paraffin 14. The zinc cup is sealed at its top by means of the rings 7 and 8, and evaporation of the liquid constituents is thereby prevented. When it is desired to activate the battery it is only necessary to push on the carbon rod 9 until the bobbin 11 is forced down against the bottom of the zinc cup 1. During this operation the paste originally located at 13 breaks through the paraffin layer 14 at the points where it is unsupported by serrated disc 15 and passes up around the bobbin, forming a layer 13' between the bobbin and the surrounding zinc cup. The internal circuit is thereby established and the battery is immediately ready for service. The serrated disc 15 acts as a guide for the bobbin during its passage to the bottom of the cup; the ends of the teeth with which the disc is provided sliding along the walls of the zinc cup and keeping the bobbin centrally located therein. To assist in this latter function and also to locate the disc 15 with respect to the bobbin, the disc 15 is provided with a plurality of tabs 16, giving the disc an extreme diameter somewhat larger than the internal diameter of the zinc cup. On inserting the disc 15 and the bobbin into the zinc cup at the time of assembling the battery, the tabs 16, which are comparatively narrow, are bent up along the lateral surfaces of the bobbin and take an inclined position between the bobbin electrode and the zinc cup as clearly shown in Figs. 1 and 2. In this position the resiliency of the tabs 16 effectually centers the bobbin in the zinc cup, thus preventing contact between the bobbin and cup.

The layer of paraffin 14 is forced completely to the bottom of the zinc cup and rests upon the bottom during the period of service of the battery, thus protecting the bottom of the cup from corrosion. The marginal portions of this layer, broken off by the pressure of the extruded paste, remain suspended in the paste layer 13' where they are inert and harmless.

It will be apparent that we have provided a form of construction wherein the two electrodes, while necessarily relatively movable, cannot be separated. For this reason, there is no possibility of either of the coacting electrodes being missing when it is desired to place the battery in service. The zinc cup provides complete protection for the somewhat fragile bobbin electrode and this protective covering cannot be removed. Likewise, the bobbin electrode and its disc 15 provides a protection for the body of paste 13 and its fragile cover 14, and this protection cannot be removed. The sliding fit between the carbon rod 9 and its surrounding bushing forms the simplest possible mechanical connection between the electrodes, which is substantially air-tight and yet permits movement, and economy of production is realized thereby.

It will be understood that the specific form of battery described and shown in the drawings was taken for purpose of illustration only and that the design thereof is subject to many modifications. The scope of our invention is, therefore, to be limited only by the appended claims.

We claim:

1. A dry battery of the deferred action type having inseparable electrodes relatively movable to force electrolyte between their adjacent surfaces.

2. In a dry battery of the deferred action type, a hollow zinc electrode having a seal, an aperture in said seal and a depolarizing electrode having a portion closely conforming to said aperture, and slidable therein.

3. In a dry battery of the deferred action type, a zinc cup electrode having a perforated seal, and a bobbin electrode having a portion passing through said perforated seal and slidable therein to activate the battery.

4. In a dry battery of the deferred action type, a zinc cup containing electrolyte paste in its bottom and having a constricted aperture at its top, and a bobbin electrode mounted inside said cup and above said paste, said bobbin electrode having a portion slidably passing through said aperture, whereby the bobbin electrode may be forced down into said paste.

5. In a dry battery of the deferred action type, a zinc cup, a depolarizing bobbin electrode therein, said bobbin electrode being movable with respect to said zinc cup but not removable therefrom, electrolyte paste in said zinc cup but normally out of contact with said bobbin electrode, and means outside said zinc cup for causing said paste to coat said bobbin electrode.

6. In a dry battery of the deferred action type, a zinc cup, a bobbin electrode sealed therein but movable with respect thereto, electrolyte paste within said zinc cup but normally out of contact with said bobbin electrode, and means outside said zinc cup for causing said paste to coat said bobbin electrode.

7. In a dry battery of the deferred action type, a zinc cup, a bobbin electrode sealed therein but movable with respect thereto, electrolyte paste within said zinc cup but normally out of contact with said bobbin electrode, and means for moving said bobbin electrode with respect to said zinc cup and thereby causing said paste to coat said bobbin electrode.

8. In a dry battery of the deferred action type, a hollow zinc electrode having a constricted aperture, a depolarizing electrode having a portion mounted within said zinc electrode and another portion projecting through said constricted aperture, the portion of the depolarizing electrode within the zinc electrode being of larger diameter than the constricted aperture, and a body of electrolyte paste within the zinc electrode and substantially out of contact with the depolarizing elecrode.

In testimony whereof, we affix our signatures.

RAYMOND C. BENNER.
HARRY F. FRENCH.